(12) United States Patent
Prince

(10) Patent No.: US 9,430,725 B2
(45) Date of Patent: Aug. 30, 2016

(54) UNIQUE IDENTIFIER INSERT FOR PERISHABLE OR CONSUMABLE TOOLING

(71) Applicant: Sikorsky Aircraft Corporation, Stratford, CT (US)

(72) Inventor: Scott Robert Prince, Thorndale, PA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/837,704

(22) Filed: Aug. 27, 2015

(65) Prior Publication Data

US 2016/0063288 A1    Mar. 3, 2016

Related U.S. Application Data

(60) Provisional application No. 62/042,468, filed on Aug. 27, 2014.

(51) Int. Cl.

| *G06F 19/00* | (2011.01) |
| *G06Q 30/00* | (2012.01) |
| *G06Q 90/00* | (2006.01) |
| *G06K 19/04* | (2006.01) |
| *G06Q 10/00* | (2012.01) |

(52) U.S. Cl.
CPC ............... *G06K 19/04* (2013.01); *G06Q 10/20* (2013.01)

(58) Field of Classification Search
USPC ......................................... 235/385, 375, 487
See application file for complete search history.

(56) References Cited

U.S. PATENT DOCUMENTS

| 6,519,500 | B1 * | 2/2003 | White | G05B 19/00 156/73.1 |
| 2005/0270160 | A1 * | 12/2005 | Chan | G06K 19/07749 340/572.8 |
| 2008/0082579 | A1 * | 4/2008 | Huang | G05B 19/418 |
| 2012/0145778 | A1 * | 6/2012 | Cong | G06F 19/366 235/375 |
| 2014/0277662 | A1 * | 9/2014 | Kesler | G05B 19/41875 700/97 |
| 2014/0328964 | A1 * | 11/2014 | Mark | B29C 67/0088 425/166 |

* cited by examiner

*Primary Examiner* — Edwyn Labaze
(74) *Attorney, Agent, or Firm* — Cantor Colburn LLP

(57) ABSTRACT

A device for tracking a consumable or perishable tool is provided including a connector configured to couple to a body of the consumable or perishable tool such that the connector remains in constant contact with the consumable or perishable tool for a life of the tool. The connector includes an exposed unique identifier configured to provide identification information about the tool when access by an asset management software.

10 Claims, 5 Drawing Sheets

UNIQUE IDENTIFIER INSERT FOR PERISHABLE OR CONSUMABLE TOOLING

CROSS-REFERENCE TO RELATED APPLICATIONS

This application claims the benefit of U.S. provisional patent application Ser. No. 62/042,468 filed Aug. 27, 2014, the entire contents of which are incorporated herein by reference.

BACKGROUND OF THE INVENTION

Exemplary embodiments of the invention generally relate to rotary wing aircrafts, and more particularly, to a device and method for identifying and tracking consumable or perishable tools and equipment used for maintenance of a rotary wing aircraft.

Maintenance performed on an aircraft, such as a rotary wing aircraft for example, often requires a variety of tools and equipment, as well as one or more maintenance personnel. The more complex the maintenance being performed, the greater the risk is for error. An example of such an error is inadvertently leaving a tool within the aircraft after maintenance has been completed. Tools or other equipment that are left behind may create a potent safety hazard to operation of the aircraft and to its occupants. Therefore, tool control is critically important in the aerospace industry.

As a result, many organizations have started using systems having asset management software to track maintenance equipment to reduce the risk of a foreign object, such as a tool, being left behind in an aircraft. This type of software generally tracks a unique identifier affixed to each tool as the tools are scanned into and out of a storage location. These systems work well for monitoring durable tooling, such as hammers, and screwdrivers for example, having several years of service life. However, implementing these systems to track perishable or consumable tools having a short life span, such as tapes and adhesives for example, has been less effective. Some systems require that a new unique identifier be placed on the consumable tooling every time the tooling is refreshed or returned to storage. Alternatively, other systems use a generic identifier to represent the total perishable tool population. As a result, all of these methods of tracking consumable tools are subject to error and provide incomplete foreign object detection and foreign object damage control.

BRIEF DESCRIPTION OF THE INVENTION

According to one embodiment of the invention, a device for tracking a consumable or perishable tool is provided including a connector configured to couple to a body of the consumable or perishable tool such that the connector remains in constant contact with the consumable or perishable tool for a life of the tool. The connector includes an exposed unique identifier configured to provide identification information about the tool when access by an asset management software.

In addition to one or more of the features described above, or as an alternative, in further embodiments the unique identifier is configured to additionally track at least one of an expiration date, calibration data, and batch number for the consumable or perishable tool.

In addition to one or more of the features described above, or as an alternative, in further embodiments the connector is configured to extend through an opening formed in the body of the consumable or perishable tool.

In addition to one or more of the features described above, or as an alternative, in further embodiments the connector is configured to enclose at least a portion of the body of the consumable or perishable tool to couple thereto.

In addition to one or more of the features described above, or as an alternative, in further embodiments the connector includes a complementary first piece and second piece configured to couple to one another about the body of the consumable or perishable tool.

In addition to one or more of the features described above, or as an alternative, in further embodiments the first piece and the second piece are configured to threadably couple to one another.

In addition to one or more of the features described above, or as an alternative, in further embodiments the connector is formed from a durable plastic material.

In addition to one or more of the features described above, or as an alternative, in further embodiments the connector is formed via an additive manufacturing process.

In addition to one or more of the features described above, or as an alternative, in further embodiments the consumable or perishable tool is a roll of tape.

In addition to one or more of the features described above, or as an alternative, in further embodiments the consumable or perishable tool is a tube of adhesive, caulk or other sealant.

A tracking assembly is provided including a consumable or perishable tool having a non-usable body. A connector is coupled to the body such that the connector remains in constant contact with the consumable or perishable tool for a life of the tool. The connector includes an exposed unique identifier configured to provide identification information about the tool when access by an asset management system.

Technical effects include a connector having a unique identifier for tracking one or more features of a consumable or perishable tool.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
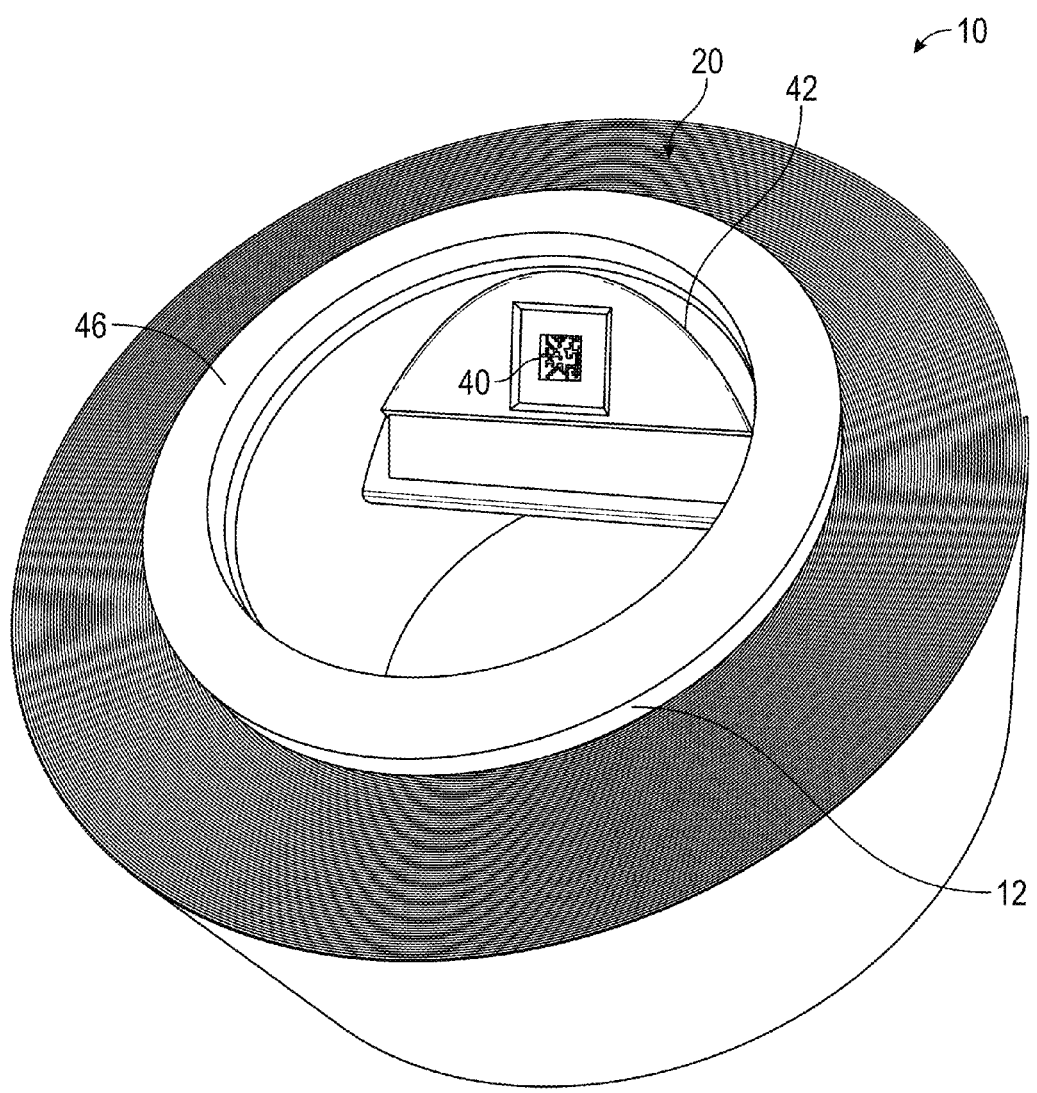
FIG. 1 is a perspective view of a connector attached to a consumable or perishable tool according to an embodiment of the invention.
Figure 2:
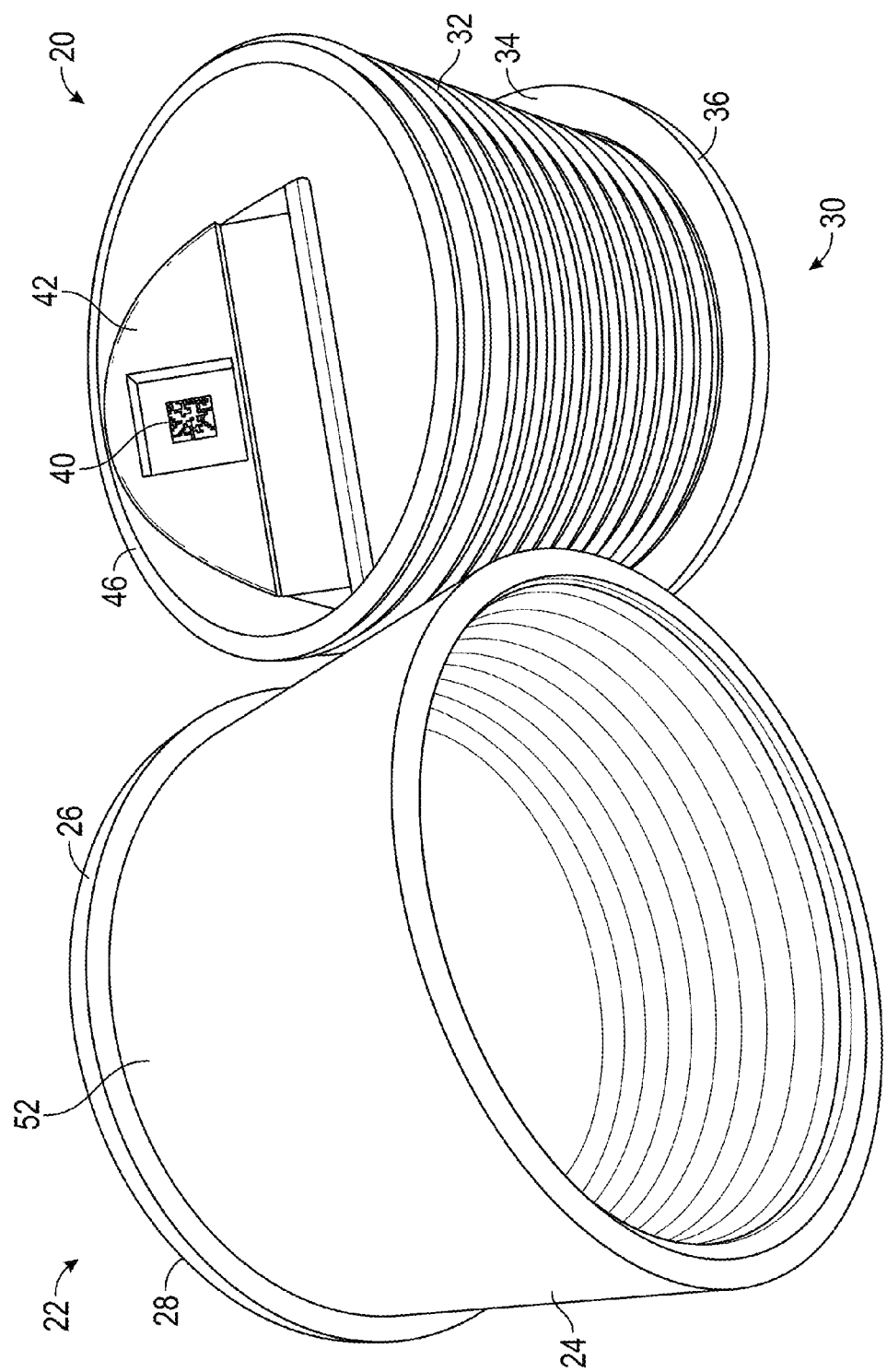
FIG. 2 is a perspective view of the separated first piece and second piece of the connector of FIG. 1 according to an embodiment of the invention.
Figure 3:
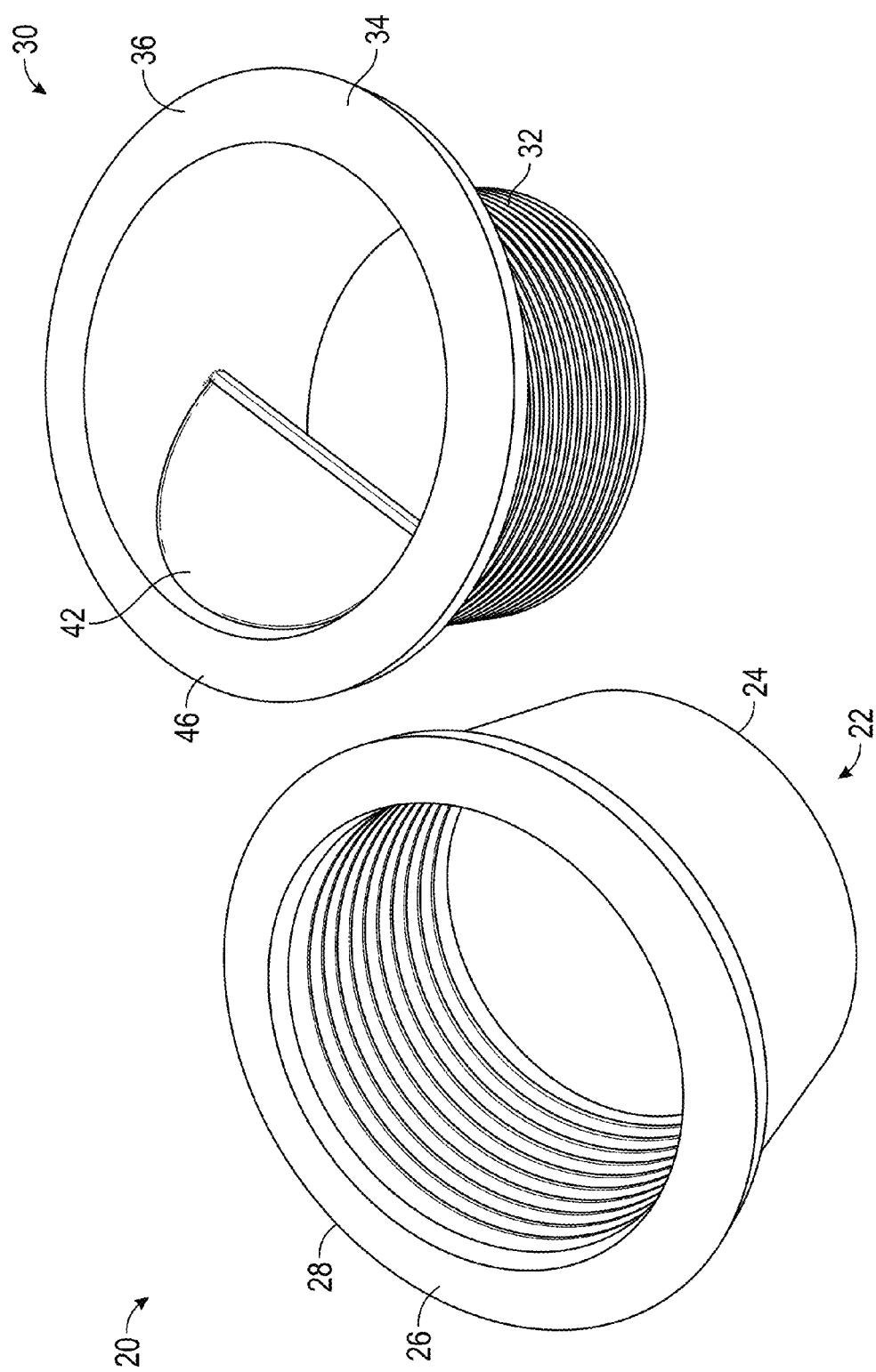
FIG. 3 is another perspective view of the separated first piece and second piece of the connector of FIG. 1 according to an embodiment of the invention.
Figure 4:
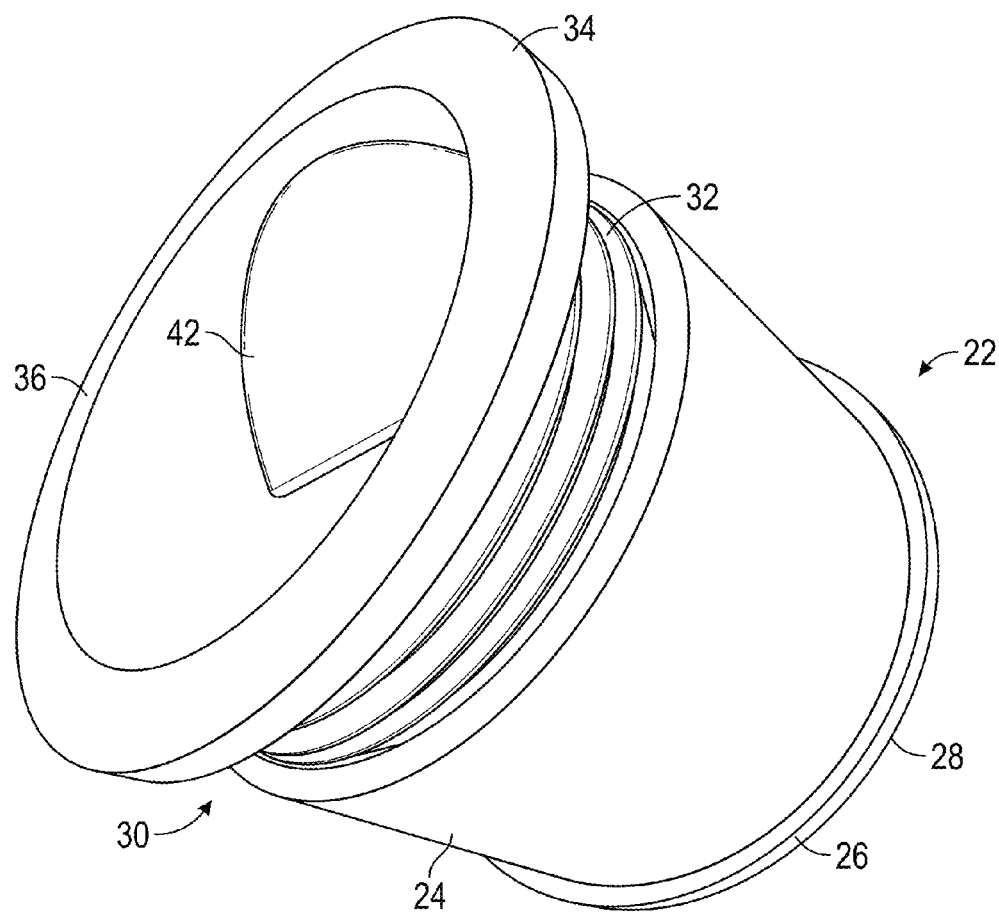
FIG. 4 is a perspective view of the connector without a consumable or perishable tool attached thereto, according to an embodiment of the invention.

The detailed description explains embodiments of the invention, together with advantages and features, by way of example with reference to the drawings.

DETAILED DESCRIPTION OF THE INVENTION

Multiple mechanics, technicians, or other operators use a variety of tools, including perishable or consumable tools during the assembly of or while performing maintenance on an aircraft, such as a rotary wing aircraft for example. Consumable tools or equipment consist of items having a relatively short life, such as single-use items for example, or items that are expended during use. Examples of such consumable equipment includes, but is not limited to, tape, sealant, and adhesive for example. Similarly, perishable tools include tools or other equipment that have a noted expiration or "best by" date to ensure optimal performance or effectiveness.

Referring now to the FIGS., an example of a connector 20 configured to attach to a non-usable or generally constant body 12 of either a perishable or consumable tool 10 is illustrated. As illustrated in the FIGS. the consumable or perishable tool 10 is a roll of tape. However, other consumable or perishable tools 10 are within the scope of the invention. In the illustrated, non-limiting embodiment, the connector 20 includes a first piece 22 having a substantially hollow cylindrical body 24 with an outwardly extending flange 26 arranged at a first end 28 thereof. Similarly, a second piece 30 of the connector 20 has a substantially hollow cylindrical body 32 with an outwardly extending flange 34 arranged at a first end 36 thereof. Though the illustrated first and second pieces 22, 30 of the connector 20 are shown as being substantially hollow to reduce the overall amount of material of the connector 20, other embodiments where one or both pieces 22, 30 of the connector 20 are substantially solid (see FIG. 5) are within the scope of the invention. In addition, though the illustrated first and second piece 22, 30 of the connector 20 are cylindrical, other shapes complementary to the body 12 of the perishable or consumable tool 10 being tracked, such as square, rectangular, triangular, and semi-circular for example, are within the scope of the invention.

In the illustrated, non-limiting embodiment, an inner diameter of the first piece 22 and the outer diameter of the second piece 30 are generally complementary such that the cylindrical body 32 of the second piece 30 is generally received within the cylindrical body 24 of the first piece 22 and the outwardly extending flanges 26, 34 are arranged at opposite ends of the connector 20. Alternatively, the body 24 of the first piece 22 may be received within the body 32 of the second piece 30.

A unique identifier 40 configured to provide identification information is attached to an exposed and/or easily accessible portion of the connector 20. Examples of unique identifiers 40, include but are not limited to barcodes, radio frequency identification (RFID) tags, optical tags, magnetic tags, as well as other means known to a person having ordinary skill in the art. In some embodiments, such as where the tool 10 that the connector 20 is configured to monitor is perishable for example, additional information, for example the expiration date, calibration date, or batch number of the tool 10, may also be recorded and tracked using the unique identifier 40. As a result, the asset management software used in conjunction with the connector 20 to track the consumable or perishable tools 10 can be programmed to provide alerts or prevent access to the tools 10 when the tool is beyond its expiration date or when calibration is needed.

Figure 5:
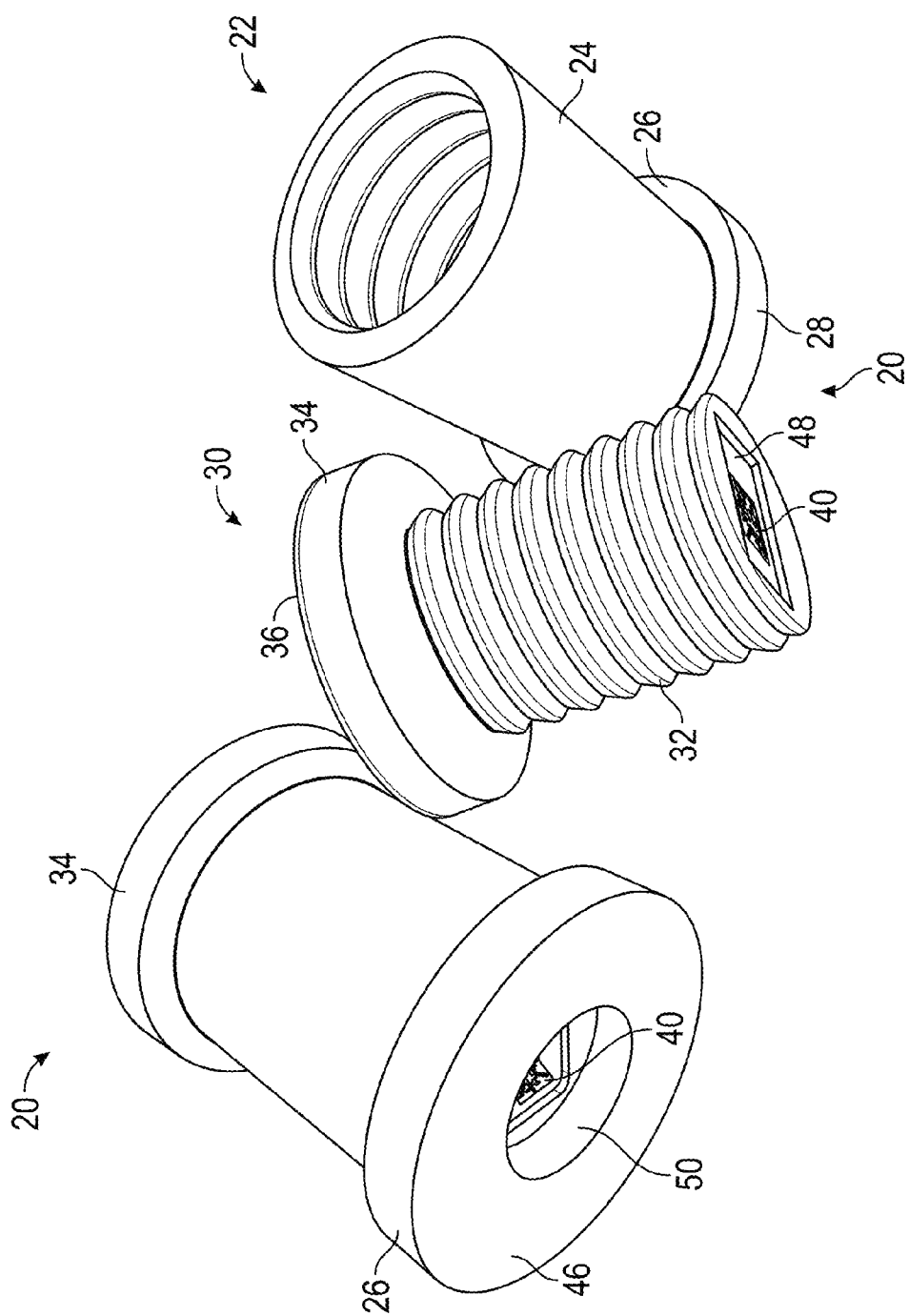
FIG. 5 is a perspective view of other connectors configured to track a consumable or perishable tool according to an embodiment of the invention.

In the non-limiting embodiment illustrated in FIGS. 1-4, a unique identifier 40 is mounted to an angled flange 42 integrally formed with the inner diameter of the hollow cylindrical body 32 of the second piece 30 of the connector 20. When the first and second pieces 22, 30 of the connector 20 are coupled, the angled flange 42, and therefore the unique identifier 40, is positioned adjacent an exposed end 46 of the connector 20. In other embodiments, the unique identifier 40 may be positioned at other locations on the connector 20, such as on a surface of one of the flanges 26, 34, or at a substantially solid end 48 of one of the first and second pieces 22, 30, as illustrated in FIG. 5 for example.

The first and second pieces 22, 30 of the connector 20 are configured to couple to one another to attach the connector 20 to the consumable or perishable tool 10 for the remainder of the life of the tool 10. In the illustrated, non-limiting embodiment, the first piece 22 and the second piece 30 are configured to threadably engage. An opening or groove 50, such as for a screw driver or a hex key for example, may similarly be formed in an end of one of the first piece 22 and the second piece 30 to selectively couple or decouple the first and second piece 22, 30 of the connector 20. Alternatively, other coupling means for selectively connecting the first and second pieces 22, 30, such as a snap fit closure or a stud configured to slide or twist to lock within an opening for example, are within the scope of the invention.

The connector 20 may be formed from any durable material, such as plastic, metal, or some combination thereof for example. In one embodiment, the first and second pieces 22, 30 of the connector 20 are formed through an additive manufacturing process, such as with a three-dimensional printer for example. In another embodiment, the first and second pieces 22, 30 of the connector 20 are formed through an injection molding process. Depending on the material used for the connector 20, other manufacturing process may be used to manufacture the components of the connector 20. In addition, one or more distinct colors may be applied to the connector 20 to identify that the connector 20 is intended for use with a specific size or type of tool 10.

To attach the illustrated connector 20 to a consumable or perishable tool 10, such as roll of tape, a hollow opening (not shown) of the tool 10 is arranged concentrically with an outer surface of the hollow cylindrical body 24 of the first piece 22. The inner diameter of the tool 10 should be substantially equal to the outer diameter of the hollow cylindrical body 24 of the first piece 22 to prevent unintended movement or removal of the tool 10 therefrom. In addition, the length of the cylindrical body 24, 32 of the first and second piece 22, 30, should be substantially equal to a dimension of the tool 10, such as the width in instances where the tool 10 is a roll of tape. The second piece 30 of the connector 20 attaches to the first piece 22 of the connector 20 such that the outwardly extending flanges 26, 34 arranged at an end 28, 36 of both the first piece 22 and the second piece 30 limit movement of the tool 10 relative to the connector 20. Once attached, the connector 20 remains in constant connection with the tool 10 to effectively track the physical location of the tool 10 during maintenance activities for the remainder of the life of the tool 10, absent operator intervention.

Although the connector 20 illustrated and described herein is configured to extend through a hollow center of the consumable or perishable tool 10, embodiments where the connector 20 surrounds or encloses at least a portion of the exterior of the tool 10, such as when the tool 10 is a tube of adhesive for example, are within the scope of the invention. In addition, although the connector 20 is described for use with a consumable or perishable tool 10, the connector 20 may be adapted easily by person having ordinary skill in the art for use with a durable tool having an extended life, such as a hammer or wrench for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device for tracking a consumable or perishable tool, comprising:
    a connector configured to couple to a body of the consumable or perishable tool such that the connector remains in constant contact with the consumable or perishable tool for a life of the tool, the connector including a first piece and a second piece complementary to the first piece, the first piece and the second piece being configured to couple about the body to restrict movement of the body relative to the connector, the connector including an exposed unique identifier configured to provide identification information about the tool when accessed by an asset management software.

2. The device according to claim 1, wherein the unique identifier is configured to additionally track at least one of an expiration date, calibration data, and batch number for the consumable or perishable tool.

3. The device according to claim 1, wherein the connector is configured to extend through an opening formed in the body of the consumable or perishable tool to couple thereto.

4. The device according to claim 1, wherein the connector is configured to enclose at least a portion of the body of the consumable or perishable tool to couple thereto.

5. The device according to claim 1, wherein the first piece and the second piece are configured to threadably couple to one another.

6. The device according to claim 1, wherein the connector is formed from a durable plastic material.

7. The device according to claim 1, wherein the connector is formed via an additive manufacturing process.

8. The device according to claim 1, wherein the consumable or perishable tool is a roll of tape.

9. The device according to claim 1, wherein the consumable or perishable tool is a tube of adhesive, caulk, or other sealant.

10. A tracking assembly comprising:
    a consumable or perishable tool having a non-usable body; and
    a connector coupled to the body such that the connector remains in constant contact with the consumable or perishable tool for a life of the tool, the connector including a first piece and a second piece complementary to the first piece, the first piece and the second piece being configured to couple about the body to restrict movement of the body relative to the connector, the connector including an exposed unique identifier configured to provide identification information about the tool when accessed by an asset management system.

* * * * *